United States Patent
Nagao et al.

(10) Patent No.: US 10,337,403 B2
(45) Date of Patent: Jul. 2, 2019

(54) GAS TURBINE COMBINED CYCLE FACILITY AND WATER-SURFACE FACILITY

(71) Applicant: MITSUBISHI HEAVY INDUSTRIES COMPRESSOR CORPORATION, Tokyo (JP)

(72) Inventors: Hideki Nagao, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 722 days.

(21) Appl. No.: 14/892,275

(22) PCT Filed: May 30, 2014

(86) PCT No.: PCT/JP2014/064483
§ 371 (c)(1),
(2) Date: Nov. 19, 2015

(87) PCT Pub. No.: WO2014/208274
PCT Pub. Date: Dec. 31, 2014

(65) Prior Publication Data
US 2016/0186659 A1    Jun. 30, 2016

(30) Foreign Application Priority Data

Jun. 25, 2013   (JP) .................................. 2013-132680

(51) Int. Cl.
*B63B 35/44*    (2006.01)
*F02C 6/18*     (2006.01)
(Continued)

(52) U.S. Cl.
CPC ................ *F02C 6/18* (2013.01); *F01K 15/00* (2013.01); *F01K 23/10* (2013.01); *F02C 7/20* (2013.01);
(Continued)

(58) Field of Classification Search
CPC .... F02C 6/18; F02C 7/20; F02C 6/203; F01K 15/00; F01K 23/10; F01K 15/04; F05D 2250/312; B63B 35/44
See application file for complete search history.

(56) References Cited

U.S. PATENT DOCUMENTS

| | | | |
|---|---|---|---|
| 2,604,755 A * | 7/1952 | Nordstrom ............ | F01K 23/103 60/39.17 |
| 3,147,742 A * | 9/1964 | May ...................... | F22B 1/1869 122/235.11 |

(Continued)

FOREIGN PATENT DOCUMENTS

| | | |
|---|---|---|
| CN | 1225411 A | 8/1999 |
| JP | 57-191406 A | 11/1982 |

(Continued)

OTHER PUBLICATIONS

International Search Report (form PCT/ISA/210), dated Sep. 2, 2014, for International Application No. PCT/JP2014/064483, along with an English translation.

(Continued)

*Primary Examiner* — Todd E Manahan
*Assistant Examiner* — Eric W Linderman
(74) *Attorney, Agent, or Firm* — Birch, Stewart, Kolasch & Birch, LLP (57) ABSTRACT

A gas turbine combined cycle (GTCC) facility (10A) provided with a gas turbine unit (20), a heat recovery steam generator (30) for recovering heat and producing steam from exhaust gas produced by the gas turbine unit (20), and an exhaust duct (32) for guiding the exhaust gas of the gas turbine unit (20) to the heat recovery steam generator (30). At least a portion of the heat recovery steam generator (30) is disposed in the same plane as the gas turbine unit (20), and the heat recovery steam generator (30) is disposed side-by- (Continued)

side so that a direction in which exhaust gas flows in the heat recovery steam generator is parallel to a turbine axis direction of the gas turbine unit.

16 Claims, 6 Drawing Sheets

(51) Int. Cl.
| | |
|---|---|
| F01K 23/10 | (2006.01) |
| F02C 7/20 | (2006.01) |
| F01K 15/00 | (2006.01) |
| F01K 15/04 | (2006.01) |
| F02C 6/20 | (2006.01) |

(52) U.S. Cl.
CPC .............. B63B 35/44 (2013.01); F01K 15/04 (2013.01); F02C 6/203 (2013.01); F05D 2250/312 (2013.01); Y02E 20/16 (2013.01)

(56) References Cited

U.S. PATENT DOCUMENTS

| | | | | |
|---|---|---|---|---|
| 3,599,589 | A * | 8/1971 | Busey | B63B 1/041 114/261 |
| 3,628,884 | A * | 12/1971 | Mierley, Sr. | F01D 25/26 415/213.1 |
| 3,837,308 | A * | 9/1974 | Harvey | B63B 35/44 114/264 |
| 3,879,616 | A * | 4/1975 | Baker | F01K 13/02 290/2 |
| 3,934,553 | A * | 1/1976 | Freeman, Jr. | F22B 1/1815 122/7 B |
| 3,962,877 | A * | 6/1976 | Schiemichen | F01K 7/40 405/203 |
| 4,041,721 | A * | 8/1977 | Kniel | B63B 35/44 114/74 A |
| 4,572,110 | A * | 2/1986 | Haeflich | F01K 23/108 122/1 R |
| 4,976,100 | A * | 12/1990 | Lee | F01K 23/108 60/39.182 |
| 5,271,218 | A * | 12/1993 | Taylor | F02C 7/222 60/739 |
| 5,339,891 | A * | 8/1994 | Kidaloski | F22B 37/001 122/494 |
| 5,379,588 | A * | 1/1995 | Tomlinson | F01K 23/106 60/39.182 |
| 5,927,225 | A * | 7/1999 | Jeter | B63B 27/34 114/230.1 |
| 6,178,734 | B1 * | 1/2001 | Shibuya | F01K 23/106 60/39.182 |
| 6,263,662 | B1 * | 7/2001 | Nagashima | F01K 23/106 122/7 B |
| 6,298,655 | B1 * | 10/2001 | Lee | F01D 25/30 60/39.182 |
| 6,397,575 | B2 * | 6/2002 | Tomlinson | F01K 23/106 60/39.182 |
| 6,474,069 | B1 * | 11/2002 | Smith | F01K 23/106 60/39.182 |
| 6,536,203 | B2 * | 3/2003 | Kamatani | F01D 25/28 122/7 R |
| 6,748,734 | B1 * | 6/2004 | Coleman | F01D 25/30 122/7 B |
| 7,100,356 | B2 * | 9/2006 | Han | F01D 25/30 122/7 R |
| 8,028,967 | B2 * | 10/2011 | Busekros | F01D 25/28 248/671 |
| 9,249,733 | B2 * | 2/2016 | Hallam | F01D 25/285 |
| 9,958,217 | B1 * | 5/2018 | Oakes | F22B 21/02 |
| 9,970,210 | B2 * | 5/2018 | Onishi | F01K 13/00 |
| 2003/0061796 | A1 * | 4/2003 | Kaijima | F01K 11/02 60/39.182 |
| 2004/0243350 | A1 * | 12/2004 | Smith | F01K 7/22 702/185 |
| 2005/0027586 | A1 * | 2/2005 | Bacon | G06Q 10/06 705/7.12 |
| 2006/0243186 | A1 * | 11/2006 | Park | B63B 11/02 114/264 |
| 2006/0260315 | A1 * | 11/2006 | Park | B63B 35/44 60/665 |
| 2008/0187431 | A1 * | 8/2008 | Brown | F01D 25/28 415/1 |
| 2009/0220401 | A1 * | 9/2009 | Nakagawa | B01D 53/8625 423/239.1 |
| 2010/0058764 | A1 * | 3/2010 | Conchieri | F01K 23/106 60/739 |
| 2010/0077722 | A1 * | 4/2010 | Sengar | F01K 23/106 60/39.182 |
| 2010/0215558 | A1 * | 8/2010 | Kraemer | B01D 53/8656 423/239.1 |
| 2010/0281877 | A1 * | 11/2010 | Asanaka | F01K 13/02 60/778 |
| 2011/0048010 | A1 * | 3/2011 | Balcezak | F01D 25/30 60/645 |
| 2011/0158370 | A1 * | 6/2011 | Morgan | B63B 35/44 376/210 |
| 2012/0102951 | A1 * | 5/2012 | Kraemer | F01K 23/10 60/645 |
| 2012/0102970 | A1 * | 5/2012 | Kraemer | F01K 17/02 60/801 |
| 2012/0198846 | A1 * | 8/2012 | Sieben | F01K 23/10 60/653 |
| 2014/0020614 | A1 * | 1/2014 | Franceschini | B63B 9/00 114/264 |
| 2014/0027097 | A1 * | 1/2014 | De Barros | F02C 7/143 165/154 |
| 2014/0162199 | A1 * | 6/2014 | Abrol | F23J 15/02 431/253 |
| 2014/0261128 | A1 * | 9/2014 | McKillop | B63B 17/0081 114/121 |
| 2015/0184591 | A1 * | 7/2015 | Giancotti | F01D 25/28 60/798 |
| 2016/0102615 | A1 * | 4/2016 | Trippold | F02C 3/04 60/772 |
| 2016/0116209 | A1 * | 4/2016 | Nagao | F01K 23/10 62/611 |
| 2017/0138079 | A1 * | 5/2017 | Onishi | F01K 13/00 |
| 2017/0191750 | A1 * | 7/2017 | De Barros | F02C 3/06 |
| 2017/0234165 | A1 * | 8/2017 | Kersey | F16M 9/00 60/798 |
| 2018/0186442 | A1 * | 7/2018 | Maier | F01D 25/28 |
| 2018/0347469 | A1 * | 12/2018 | Giancotti | F01D 25/28 |

FOREIGN PATENT DOCUMENTS

| | | |
|---|---|---|
| JP | 58-129008 U | 9/1983 |
| JP | 59-99006 A | 6/1984 |
| JP | 59-115806 U | 8/1984 |
| JP | 4-366303 A | 12/1992 |
| JP | 11-13416 A | 1/1999 |
| JP | 2002-195054 A | 7/2002 |
| JP | 2005-42600 A | 2/2005 |

OTHER PUBLICATIONS

Written Opinion of the International Searching Authority (form PCT/ISA/237), dated Sep. 2, 2014, for International Application No. PCT/JP2014/064483, along with an English translation.
Office Action dated May 17, 2016 in Counterpart CN Application No. 201480027525.2 with partial English Translation.

* cited by examiner

GAS TURBINE COMBINED CYCLE FACILITY AND WATER-SURFACE FACILITY

TECHNICAL FIELD

The present invention relates to a gas turbine combined cycle facility installed on vessels or floating structures used on a water surface, and a water-surface facility including the same.

Priority is claimed on Japanese Patent Application No. 2013-132680, filed Jun. 25, 2013, the content of which is incorporated herein by reference.

BACKGROUND ART

Facilities including a gas turbine may be mounted on water-surface facilities used in a floating state on water, such as vessels, or floating structures including floating bodies that float on water.

As such facilities including a gas turbine, for example, there are facilities that extract and liquefy natural gas from marine gas fields and are mounted on gas tanks equipped on gas carriers, power generation facilities that drive power generators using gas turbines, and the like.

In order to enhance the efficiency of these facilities, gas turbine combined cycle (GTCC) facilities that produce steam with an exhaust gas boiler using exhaust gas from a gas turbine are present. In the gas turbine combined cycle, compressors or power generators for liquefying natural gas are driven by steam turbines driven with this steam.

In order to achieve installation with a small space in such a GTCC facility, PTL 1 discloses a configuration in which a gas turbine, a power generator, and the like are installed in an upper part of a supporting frame, and a lower part of the supporting frame is provided with an exhaust gas boiler.

CITATION LIST

Patent Literature

[PTL 1] Japanese Unexamined Patent Application Publication No. 2002-195054

SUMMARY OF INVENTION

Technical Problem

However, when it is intended to install the GTCC facility of the configuration as described in PTL 1 on water-surface facilities, such as vessels or floating structures, problems as follows occur.

First, since the installation area of various facilities is limited in the water-surface facilities, it is desired to make the installation floor space of the GTCC facility small. Although devices may be vertically stacked for this as described in PTL 1, the height of the GTCC facility increases consequently. Then, the center of gravity of the GTCC facility becomes high, which becomes a cause by which the shaking of the water-surface facilities becomes large. Therefore, it is desired to suppress the height of the GTCC facility if possible.

An object of the invention is to provide a gas turbine combined cycle facility and a water-surface facility that can achieve a lower center of gravity by suppressing height while suppressing an installation floor space, and can enhance the stability of the water-surface facility.

Solution to Problem

According to a first aspect of the invention, there is provided a gas turbine combined cycle facility including a gas turbine unit; a heat recovery steam generator for recovering exhaust heat from exhaust gas produced by the gas turbine unit and producing steam; and an exhaust duct for guiding the exhaust gas of the gas turbine unit to the heat recovery steam generator. At least a portion of the heat recovery steam generator is disposed at the same position as the gas turbine unit in a height direction. The heat recovery steam generator is disposed side-by-side so that a direction in which exhaust gas flows in the heat recovery steam generator is parallel to a turbine axis direction of the gas turbine unit.

According to a second aspect of the invention, in the gas turbine combined cycle facility, the heat recovery steam generator in the first aspect may include a plurality of boiler units each including an evaporator that produces steam through heat exchange with the exhaust gas introduced from the exhaust duct. The plurality of boiler units may be disposed to be stacked at least in a height direction in a state where the orientations of the respective boiler units are aligned. The exhaust gas may be introduced into each of the plurality of boiler units.

According to a third aspect of the invention, in the gas turbine combined cycle facility, a steam-water separator that separates steam and water, which have been produced in each of the boiler units, and circulates the separated water through the evaporator may be connected to each of the plurality of boiler units in the second aspect.

According to a fourth aspect of the invention, in the gas turbine combined cycle facility, the steam-water separators in the third aspect may be respectively disposed on upper lateral sides of the boiler units. The relative positions of the steam-water separator and the respective boiler units may be the same in the respective boiler units. The heat recovery steam generator may be used as a natural circulation boiler.

According to a fifth aspect of the invention, in the gas turbine combined cycle facility, in the third or fourth aspect, the boiler unit and the steam-water separator may be used as an assembly that are integrated in advance.

According to a sixth aspect of the invention, in the gas turbine combined cycle facility, in any one aspect of the first to fifth aspects, at least some of accessories of the gas turbine unit and accessories of the heat recovery steam generator may be disposed below the gas turbine unit.

According to a seventh aspect of the invention, a water-surface facility includes a floating body that floats on water; and the gas turbine combined cycle facility according to any one of the above aspects provided on the floating body.

Advantageous Effects of Invention

According to the gas turbine combined cycle facility and the water-surface facility, a lower center of gravity can be achieved by suppressing the height while suppressing the installation floor space, and the stability of the water-surface facility can be enhanced.

DESCRIPTION OF EMBODIMENTS

Hereinafter, embodiments for carrying out a gas turbine combined cycle facility and a water-surface facility according to the invention will be described with reference to the accompanying drawings. However, the invention is not limited only to these embodiments.

First Embodiment

Figure 1:
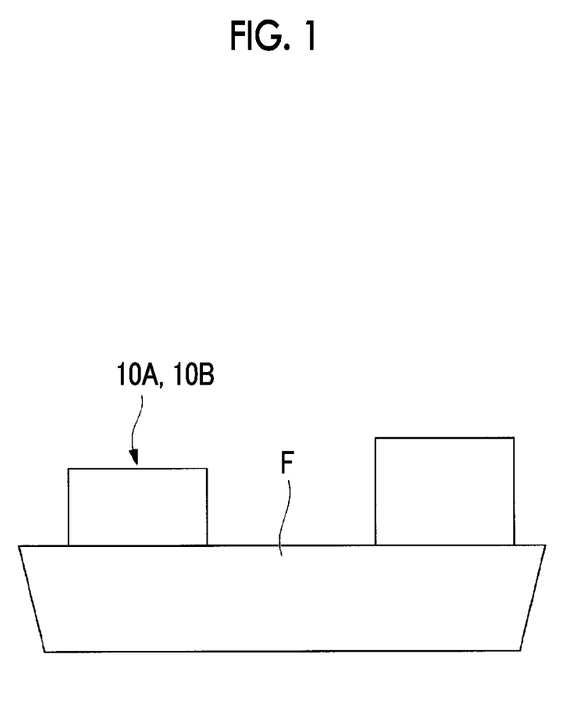
FIG. 1 is a view illustrating a schematic configuration of a vessel including a GTCC facility related to the present embodiment.
Figure 2:
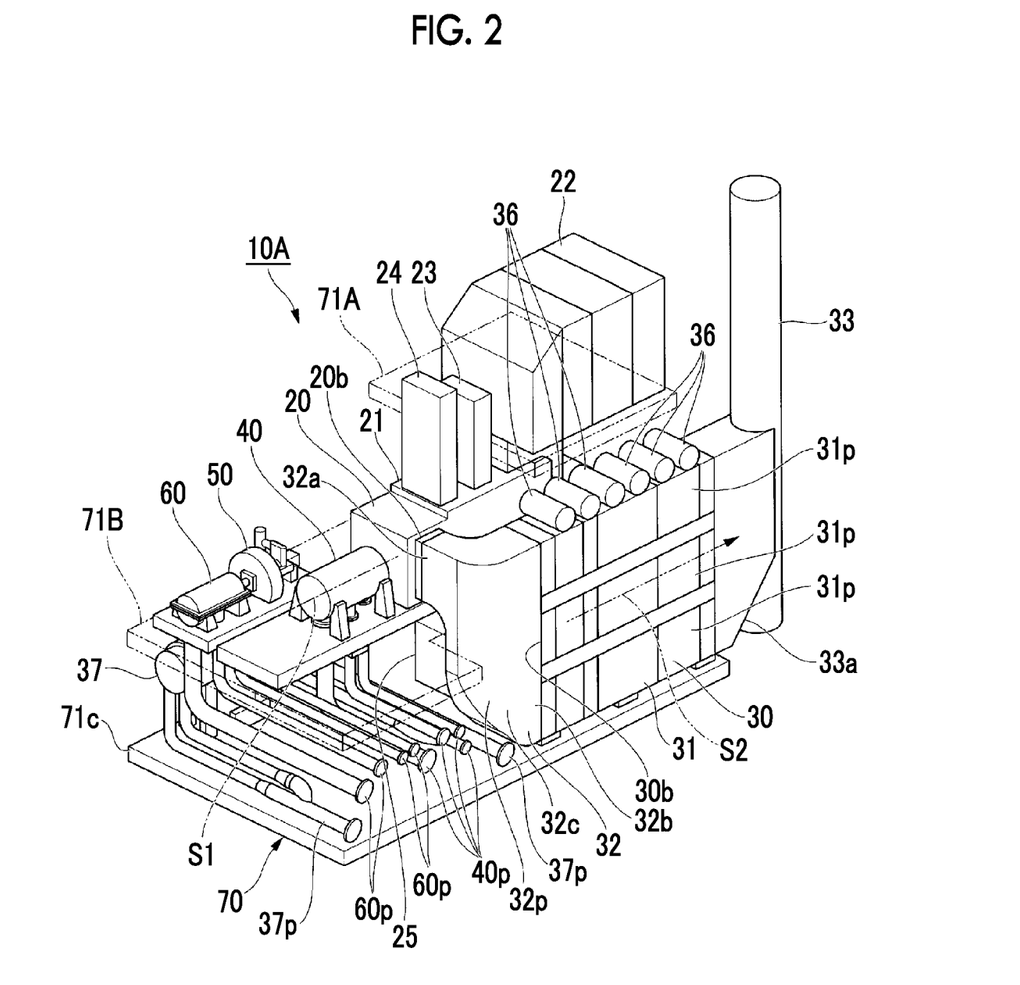
FIG. 2 is a perspective view illustrating the configuration of a GTCC facility related to a first embodiment.
Figure 3:
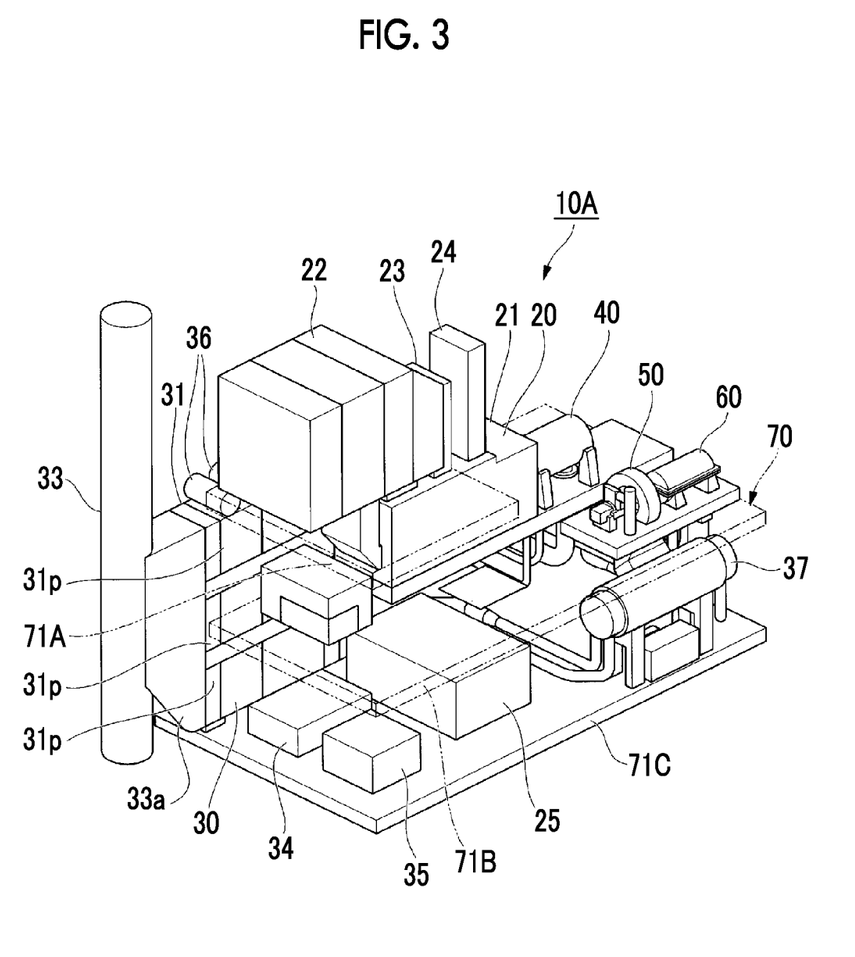
FIG. 3 is a perspective view of the GTCC facility related to the present embodiment as seen from an angle different from that of FIG. 2.
Figure 4:
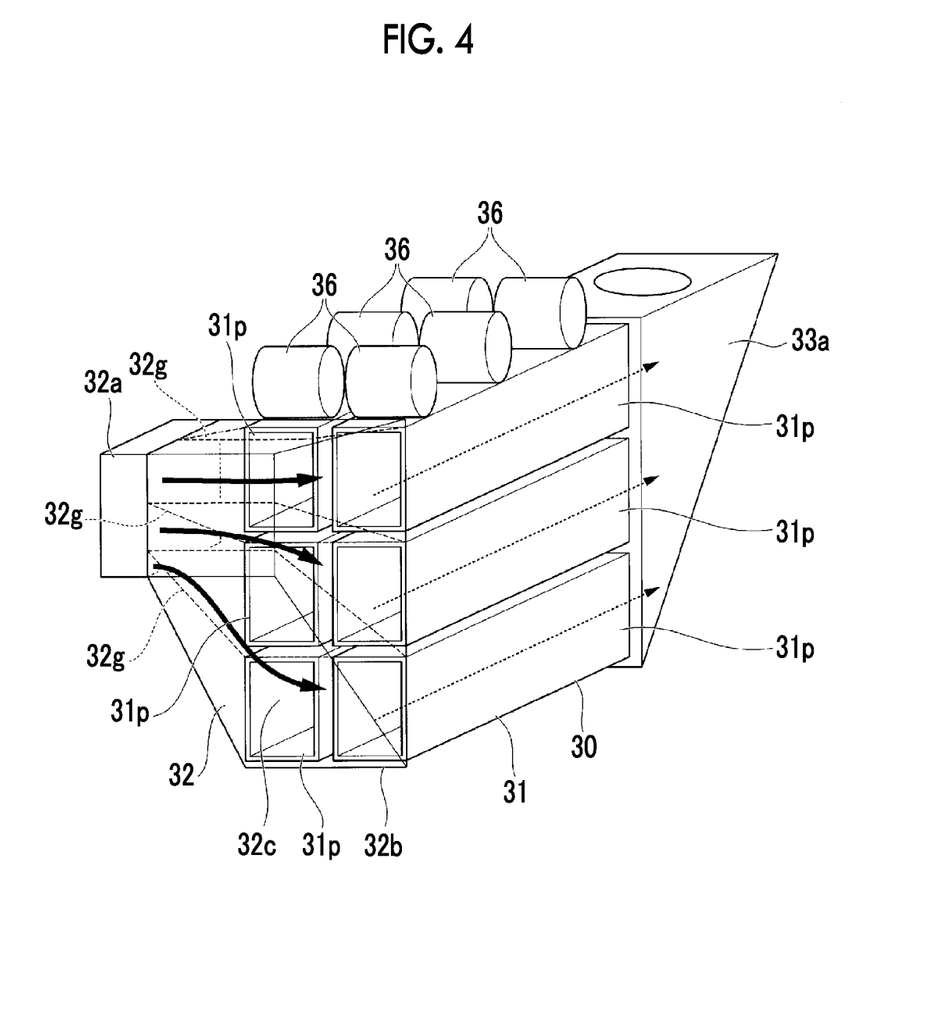
FIG. 4 is a perspective view illustrating the configuration of heat recovery steam generators provided in the GTCC facility.

FIG. 1 is a view illustrating a schematic configuration of a vessel including a gas turbine combined cycle facility (hereinafter simply referred to as a GTCC facility) related to the present embodiment. FIG. 2 is a perspective view illustrating the GTCC facility related to the present embodiment, and FIG. 3 is a perspective view illustrating the configuration of the GTCC facility related to the present embodiment as seen from an angle different from that of FIG. 2. FIG. 4 is a perspective view illustrating the configuration of heat recovery steam generators provided in the GTCC facility.

As illustrated in FIG. 1, the water-surface facility in the present embodiment liquefies, for example, natural gas. This water-surface facility includes a vessel (floating body) F and a GTCC facility 10A. The vessel F is used at spots where liquefied natural gas is extracted on the ocean. The GTCC facility 10A is installed on the vessel F.

As illustrated in FIGS. 2 and 3, the GTCC facility 10A mainly includes a gas turbine unit 20, a heat recovery steam generator (HRSG) 30, an exhaust gas connection duct 32, a gas compressor 40, a steam turbine 50, a compressor 60, and a supporting frame 70.

The gas turbine unit 20 is driven using, for example, natural gas as fuel.

The heat recovery steam generator 30 recovers exhaust heat of the exhaust gas from the gas turbine unit 20 to produce steam.

The exhaust gas connection duct 32 feeds the exhaust gas from the gas turbine unit 20 into the heat recovery steam generator 30.

The gas compressor 40 is driven by the gas turbine unit 20, and raises the pressure of a refrigerant (low-temperature side) for liquefying the natural gas.

The steam turbine 50 is driven by the steam produced in the heat recovery steam generator 30.

The compressor 60 raises the pressure of a refrigerant (high-temperature side) for liquefying the natural gas driven by the steam turbine 50.

The supporting frame 70 supports the gas turbine unit 20, the heat recovery steam generator 30, the exhaust gas connection duct 32, the gas compressor 40, the steam turbine 50, a compressor 60, and respective auxiliary machines.

For example, the gas turbine unit 20 using the natural gas as fuel rotationally drives a turbine shaft with a combustion gas produced by combusting a mixed gas in which compressed air and the fuel gas are mixed together. For this reason, the gas turbine unit 20 includes an intake duct 22, a combustor (not illustrated), the turbine shaft, and the like.

The intake duct 22 takes air into the casing 21.

The combustor compresses the air taken into the casing 21, and combusts a mixed gas in which the compressed air and the fuel gas are mixed together.

The turbine shaft has a number of turbine blades.

The casing 21 of the gas turbine unit 20 is provided with a cooling intake duct 23 and a cooling exhaust duct for cooling a control board or the like of the gas turbine unit 20 with air. The cooling intake duct 23 and the cooling exhaust duct 24 are provided so as to protrude upward.

The heat recovery steam generator 30 includes a boiler body 31, the exhaust gas connection duct (exhaust duct) 32, an exhaust stack 33, a feed-pump unit 34, a fuel valve unit 35, a steam-water separation drum (steam-water separator) 36, and the like.

The boiler body 31 has an evaporator that evaporates water and produces steam with the heat of the exhaust gas from the gas turbine unit 20.

The exhaust gas connection duct 32 takes the exhaust gas discharged from the gas turbine unit 20 into the boiler body 31.

The exhaust stack 33 exhausts the exhaust gas discharged from the boiler body 31 via a connection duct 33a to the outside.

The feed-pump unit 34 supplies water to the boiler body 31.

The fuel valve unit 35 supplies fuel for combusting the exhaust gas within the boiler body 31.

The steam-water separation drum 36 separates the steam produced in the boiler body 31 from a liquid component (water).

In addition to this, the heat recovery steam generator 30 includes a superheater (not illustrated) that supplies steam to the steam turbine 50, an evaporator (not illustrated) that feeds steam to the superheater, a coal economizer (not illustrated) that preheats water supplied to the evaporator, a condenser 37 or the like that performs condensation processing of steam with a cooling medium and supplies condensate to the coal economizer, and the like.

The superheater supplies steam to the steam turbine 50. The evaporator supplies steam to the superheater. The coal economizer preheats water to be supplied to the evaporator. The condenser 37 supplies condensate to the coal economizer.

The GTCC facility 10A is provided with a lubricating oil supply unit 25. The lubricating oil supply unit 25 supplies lubricating oil in order to achieve lubrication of bearing parts or the like in the gas turbine unit 20, the gas compressor 40, the steam turbine 50, the compressor 60, and the like.

Such a GTCC facility 10A sucks and compresses the atmospheric air from the intake duct 22 in the gas turbine unit 20, and rotationally drives the turbine shaft with a combustion gas produced by combusting a mixed gas in which the compressed air and the fuel gas are mixed together. The GTCC facility 10A drives the gas compressor 40 using this turbine shaft, thereby compressing and liquefying the natural gas.

The exhaust gas from the gas turbine unit 20 is fed into the boiler body 31 via the exhaust gas connection duct 32. In the boiler body 31, by performing heat exchange with the heat of the exhaust gas using the evaporator (not illustrated), the water fed by the feed-pump unit 34 is heated and steam is produced. The GTCC facility 10A actuates the steam turbine 50 with this steam to drive the compressor 60.

The exhaust gas of which the temperature has dropped is discharged from the exhaust stack 33 through the boiler body 31 into the atmospheric air.

Meanwhile, the supporting frame 70 in the above GTCC facility 10A holds respective devices in the following layout.

The supporting frame 70 includes base members 71A, 71B, and 71C formed in a plurality of layers (three layers in the present embodiment) in a vertical direction between a plurality of posts (not illustrated).

The base member 71A in an uppermost layer is installed with the intake duct 22. The base member 71B in an intermediate layer is installed with the gas turbine unit 20, the gas compressor 40, the steam turbine 50, and the compressor 60. The base member 71C in the lowermost layer is installed with the heat recovery steam generator 30.

In the base member 71C in the lowermost layer, the accessories, such as the lubricating oil supply unit 25, the feed-pump unit 34, the fuel valve unit 35, and the condenser 37 are disposed under the base member 71B in the intermediate layer where the gas turbine unit 20 is installed. That is, at least some of accessories of the gas turbine unit 20 and accessories of the heat recovery steam generator 30 are disposed below the gas turbine unit 20. Pipes 40p, 60p, and 37p connected to the gas compressor 40, the compressor 60, the condenser 37, and the like are disposed between the base member 71C in the lowermost layer and the base member 71B in the intermediate layer.

As seen in a plan view, the gas turbine unit 20 and the heat recovery steam generator 30 are disposed in parallel such that a turbine axis direction S1 of the gas turbine unit 20 and a flow direction S2 of exhaust gas in the heat recovery steam generator 30 are parallel to each other. The heat recovery steam generator 30 installed in the base member 71C in the lowermost layer has a height such that the boiler body 31 reaches a position above the base member 71B in the intermediate layer. Accordingly, at least a portion of the heat recovery steam generator 30 is disposed at the same position as the gas turbine unit in a height direction. In other words, the heat recovery steam generator 30 is provided such that at least a portion thereof is located within the same plane of the same height as the gas turbine unit 20.

Here, a flow direction of combustion gas along the turbine axis direction S1 in the gas turbine unit 20, and the flow direction S2 of exhaust gas in the heat recovery steam generator 30 are set so as to be mutually opposite directions while being parallel to each other. Therefore, the exhaust gas connection duct 32 that guides the exhaust gas of the gas turbine unit 20 to the heat recovery steam generator 30 includes an orientation change part 32c that changes the direction of flow of exhaust gas in the gas turbine unit 20 and the heat recovery steam generator 30. The orientation change part 32c is provided between a first end 32a connected to an outlet 20b of the gas turbine unit 20, and a second end 32b connected to an inlet 30b of the heat recovery steam generator 30.

As illustrated in FIG. 4, the boiler body 31 of the heat recovery steam generator 30 is constituted of a plurality of boiler units unit 31p, and steam-water separation drums 36 to be described below. Each boiler unit 31p includes an evaporator (not illustrated) that exchanges heat with the exhaust gas fed from the exhaust gas connection duct 32, thereby heating water to produce steam.

In the present embodiment, the boiler body 31 is configured such that six boiler units 31p are stacked in three stages in the height direction in a state where the orientations of the respective boiler units are aligned and are disposed in two rows in a width direction orthogonal to the flow direction S2 of exhaust gas.

Along with this, the exhaust gas connection duct 32 is formed such that the flow path width and flow path height thereof increase gradually from the first end 32a toward the second end 32b. Guide vanes 32g, which split the inside of the exhaust gas connection duct 32 into two in the flow path width direction and into three in the flow path height direction in order to feed exhaust gas into the respective boiler units 31p as equally as possible, are provided within the exhaust gas connection duct 32. Accordingly, exhaust gas is equally introduced into the respective boiler units 31p from the gas turbine unit 20.

In this way, the steam-water separation drums 36 of the same number as that of the boiler units 31p are installed at an upper part of the boiler body 31 consisting of an assembly of the plurality of boiler units 31p.

One steam-water separation drum 36 is connected to each boiler unit 31p. Each steam-water separation drum 36 separates a mixture of steam and water, which have been produced in the boiler unit 31p, into steam and water in the steam-water separation drum 36. While the steam separated by the boiler unit 31p is fed to the steam turbine 50, the water is circulated and is again supplied to the boiler unit 31p. In this way, each boiler unit 31p has each steam-water separation drum 36 and constitutes an independent circulation cycle.

Here, the distances of the respective boiler units 31p up to the steam-water separation drums 36 are different from each other. Therefore, a circulation pump (not illustrated) is provided in order to make the amount of circulation of water from the steam-water separation drum 36 to the boiler unit 31p constant.

In each boiler unit 31p of the heat recovery steam generator 30, the pressure of steam to be generated may be, for example, a low pressure of about 40 kPa. As the pressure of steam to be generated becomes higher, it is necessary to make the thickness of a material that constitutes the boiler unit 31p greater, which leads to an increase in weight. Thus, by making the steam pressure lower, the thickness of the material that constitutes the boiler unit 31p is made smaller, and weight reduction is achieved.

In the GTCC facility 10A, each boiler unit 31p of the heat recovery steam generator 30 includes an auxiliary combusting device (not illustrated). Each boiler unit 31p can supply fuel to the auxiliary combusting device within each boiler unit 31p, using the fuel valve unit 35, to combust exhaust gas to increase the volume of generated steam. By adjusting the amount of supply of fuel from the fuel valve unit 35, the volume of generated steam in each boiler unit 31p can also be adjusted.

As described above, at least a portion of the heat recovery steam generator 30 is disposed at the same position as the gas turbine unit 20 in a height direction, and the gas turbine unit 20 and the heat recovery steam generator 30 are disposed in parallel. Accordingly, it is possible to suppress the height of the gas turbine unit 20 and the heat recovery steam generator 30 to achieve a lower center of gravity as compared to a case where the gas turbine unit 20 and the heat recovery steam generator 30 are stacked, while suppressing the installation floor space of the GTCC facility 10A.

Additionally, the stability of the vessel F equipped with such a GTCC facility 10A is increased due to the achievement of a lower center of gravity of the GTCC facility 10A.

Additionally, in the heat recovery steam generator 30, the boiler body 31 is configured by providing the plurality of boiler units 31p in parallel in the vertical direction and the width direction.

When the boiler body 31 is split into a plurality of pieces in this way, compared to a case where the boiler body 31 is not split, the processing capacity V of exhaust gas establishes a relationship of $$V \propto (Sc)^2$$

with a scale ratio Sc, and the weight W1 of the boiler unit 31p establishes a relationship of $$W1 \propto (Sc)^3$$

with the scale ratio Sc. Therefore, the weight ratio W2 of the boiler body 31 as compared to the case where the boiler body 31 is not split is $$\begin{aligned} W2 &= (\text{Number } N \text{ of boiler units } 31p) \times \\ &\quad (\text{Weight } W1 \text{ of boiler unit } 31p) \\ &= (\text{Number } N \text{ of boiler units } 31p) \times \\ &\quad (\text{Processing capacity } V)^{3/2}. \end{aligned}$$

In the example illustrated above, since the boiler body 31 is split into six as compared to the case where the boiler body 31 is not split, the processing capacity V of the boiler unit 31p is $$V = 1/6.$$

Therefore, the weight ratio W2 of the boiler body 31 as compared with the weight of the boiler body 31 in the case where the boiler body 31 is not split is $$W2 = 6 \times (1/6)^{3/2} = 0.41,$$

and the weight of the boiler body 31 becomes equal to or less than half the weight in the case where the boiler body 31 is not split.

Additionally, the ratio A1/A2 of an installation floor space A1 of the heat recovery steam generator 30 to an installation floor space A2 in the case where the boiler body 31 is not split is $$\begin{aligned} A1/A2 &= (Sc)^2 \times (\text{Number } L \text{ of rows of boiler units } 31p) \\ &= (\text{Processing capacity } V) \times \\ &\quad (\text{Number } L \text{ of rows of boiler units } 31p). \end{aligned}$$

Therefore, in the example illustrated above, Processing capacity V=1/6, and Number L of rows of boiler units 31p=2 are established. Thus, the ratio A1/A2 of the installation floor space A1 of the heat recovery steam generator 30 to the installation floor space A2 in the case where the boiler body 31 is not split is $$A1/A2 = 1/6 \times 2 = 0.33.$$

That is, the weight of the heat recovery steam generator 30 becomes equal to or less than half the weight in the case where the boiler body 31 is not split.

In this way, in the heat recovery steam generator 30, the boiler body 31 is configured by providing the plurality of boiler units 31p in parallel in the vertical direction and the width direction, so that it is possible to achieve weight reduction while making the installation floor space of the heat recovery steam generator 30 smaller.

Additionally, when the heat recovery steam generator is constituted of one boiler unit, and the evaporator and the steam-water separator are only one, respectively, the evaporator and the steam-water separator become large-sized. In contrast, the evaporator and the steam-water separation drum 36 become small-sized by providing each of the plurality of boiler units 31p with the evaporator (not illustrated) or the steam-water separation drum 36. As a result, the degree of freedom of the installation space of the evaporator and the steam-water separation drum 36 increases, which can also contribute to size reduction of the heat recovery steam generator 30.

Additionally, in the GTCC facility 10A, at least some of the accessories, such as the lubricating oil supply unit 25, the feed-pump unit 34, the fuel valve unit 35, and the condenser 37 are disposed below the gas turbine unit 20. Accordingly, the above effects that it is possible to achieve the effective use of space in the GTCC facility 10 and to achieve a lower center of gravity while suppressing the installation floor space can be made more excellent.

Additionally in the GTCC facility 10A, at least some of the accessories, such as the lubricating oil supply unit 25, the feed-pump unit 34, the fuel valve unit 35, and the condenser 37 are disposed below the gas turbine unit 20. Thus, the heat recovery steam generator 30 is configured such that other devices are not disposed above the heat recovery steam generator 30. Accordingly, when maintenance, such as replacement of various pipes connected to the heat recovery steam generator 30, is performed, it is not necessary to detach other devices, and maintenance performance is improved.

Modification Example of First Embodiment

In the above embodiment, the steam-water separation drums 36 are provided on the boiler body 31 of the heat recovery steam generator 30. However, the invention is not limited to this.

Figure 5A:
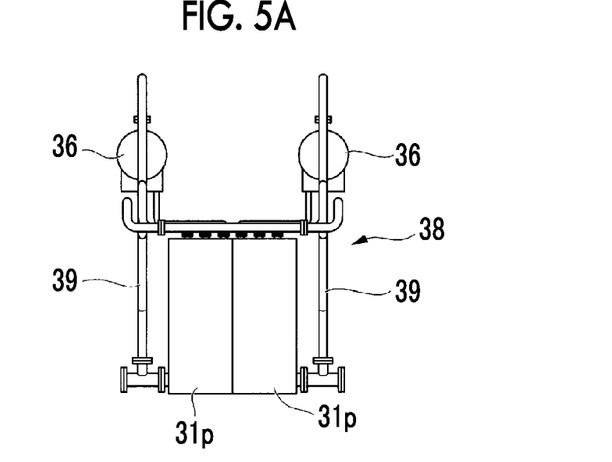
FIG. 5A is a view illustrating a modification example of the heat recovery steam generator, and is a front view of boiler units of respective stages that are vertically stacked.
Figure 5B:
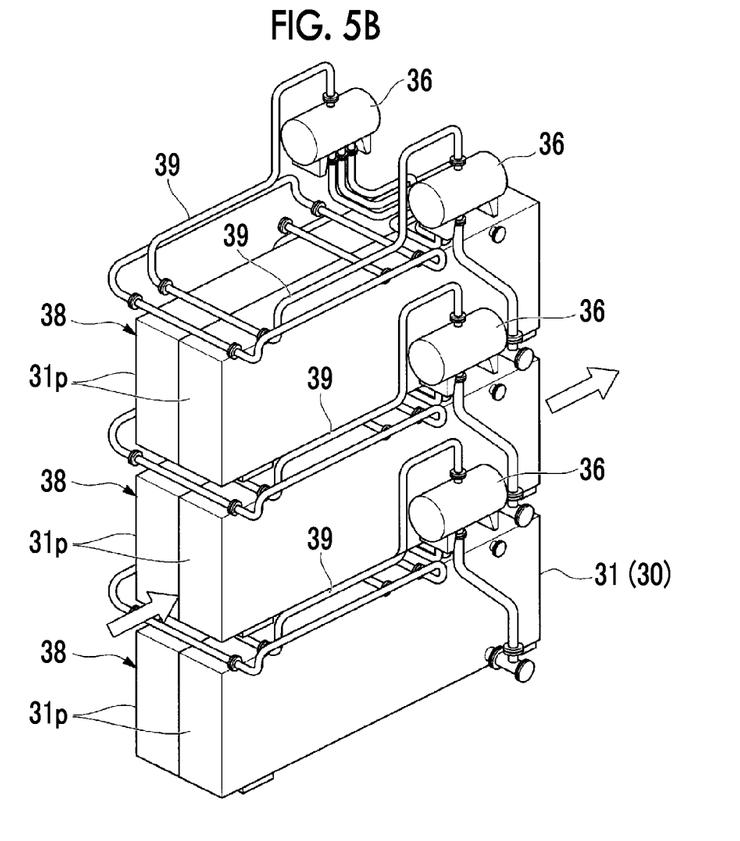
FIG. 5B is a perspective view illustrating the heat recovery steam generator in which the boiler units of FIG. 5A are stacked in the plurality of stages.

FIG. 5A is a view illustrating a modification example of the heat recovery steam generator, and is a front view of the boiler units of respective stages that are vertically stacked. FIG. 5B is a perspective view illustrating the heat recovery steam generator in which the boiler units of FIG. 5A are stacked in the plurality of stages.

As illustrated in FIG. 5B, the boiler body 31 of the heat recovery steam generator 30 includes the plurality of boiler units unit 31p, and the steam-water separation drums 36 connected to the boiler units unit 31p, respectively. In the present embodiment, the boiler body 31 is configured such that six boiler units 31p are disposed in three stages in the vertical direction and in two rows in the width direction orthogonal to the flow direction S2 of exhaust gas.

In the respective stages of the boiler body 31 in the vertical direction, two boiler units 31p and 31p disposed in two rows in the width direction are integrated.

As illustrated in FIG. 5A, each steam-water separation drum 36 is provided on a lateral and upper side of each boiler unit 31p. Two steam-water separation drums 36 and 36 connected to two boiler units 31p and 31p of each stage are disposed on both sides of the two boiler units 31p and 31p in the width direction.

The plurality of boiler units 31p are provided such that the positions of the steam-water separation drums 36 relative to the respective boiler units 31p have the same positional relationship in the respective boiler units 31p. Accordingly, in the respective boiler units unit 31p, the lengths of the pipes 39 up to the steam-water separation drums 36 can be made uniform.

Here, the two boiler units 31p and unit 31p, the two steam-water separation drums 36 and 36, and the pipes 39 and 39 connecting these, which constitute each stage of the boiler body 31 in the vertical direction, can also be an assembly 38 that is integrally assembled in advance.

If the assembly 38 is stacked in the vertical direction by assembling the assembly 38 in advance according to the number of stages in the vertical direction when the boiler body 31 is assembled, the boiler body 31 can be efficiently assembled. Moreover, in the assemblies 38 of respective stages, the dimensions or the like of parts that constitute the assemblies become common. Thus, it is also possible to suppress part costs in addition to efficiently performing assembling.

If this configuration is adopted, the pressure losses in the pipes 39 that connecting the respective boiler units 31p and the respective steam-water separation drums 36 become uniform. Thus, the volumes of generated steam in the respective boiler units 31p are made uniform.

As a result, a circulation pump for forcedly circulating water (air and water) between the steam-water separation drum 36 and the boiler unit 31p becomes unnecessary, and it is possible to use the heat recovery steam generator 30 as a natural circulation boiler. As a result, it is possible to achieve further weight reduction of the GTCC facility 10A.

Second Embodiment

Next, a second embodiment of the gas turbine combined cycle facility and the water-surface facility related to the invention will be described. In the second embodiment to be described below, FIG. 1 is incorporated herein by reference, and the same components as those of the first embodiment will be designated by the same reference numerals in the drawings, and the description thereof will be omitted.

Figure 6:
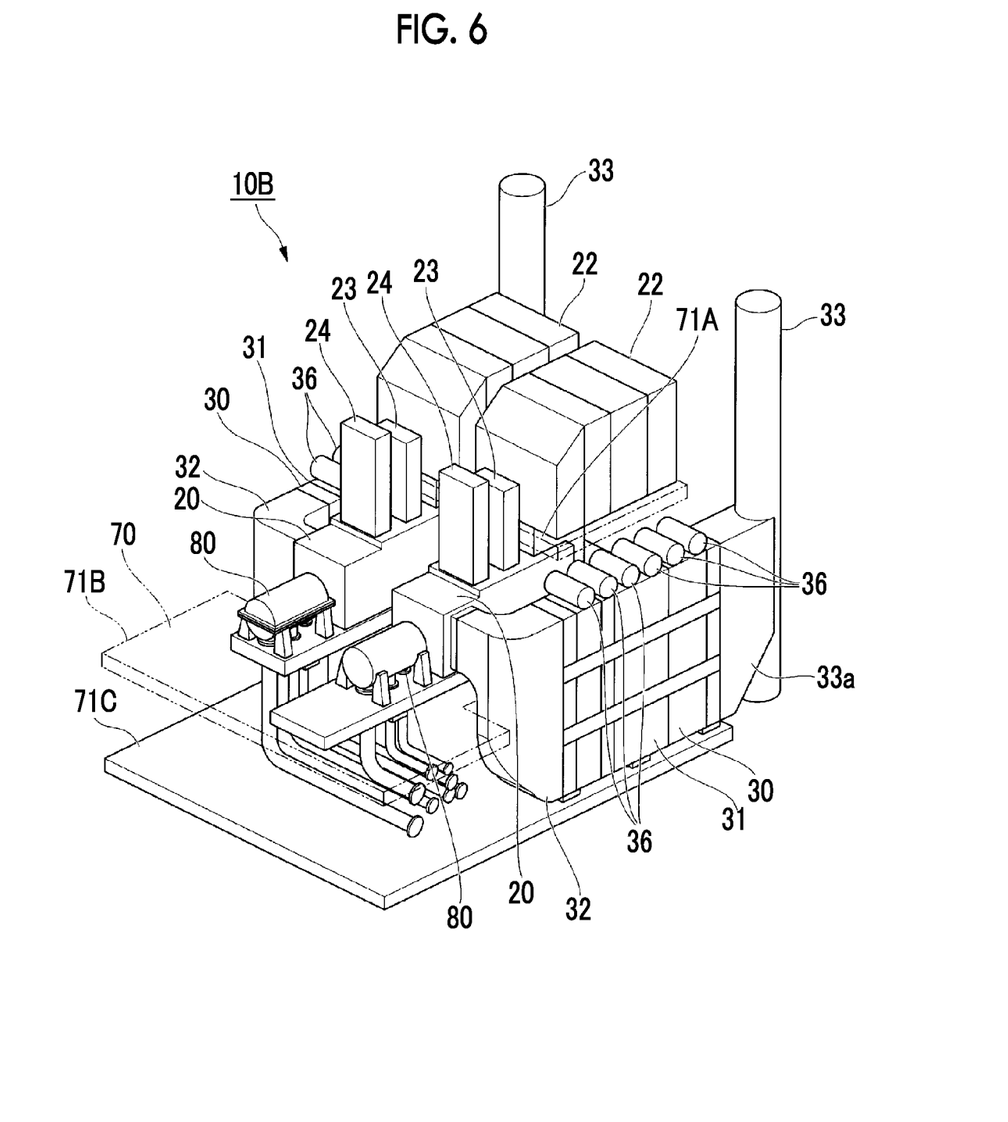
FIG. 6 is a perspective view illustrating the configuration of a GTCC facility related to a second embodiment.

FIG. 6 is a perspective view illustrating the configuration of a GTCC facility related to the second embodiment.

As illustrated in FIG. 6, a GTCC facility 10B of the present embodiment mainly includes the gas turbine unit 20, the heat recovery steam generator 30, the exhaust gas connection duct 32, a compressor 80, and a supporting frame 70. The gas turbine unit 20 is driven using, for example, natural gas as fuel. The heat recovery steam generator 30 recovers exhaust heat of the exhaust gas from the gas turbine unit 20 to produce steam. The compressor raises the pressure of a refrigerant (low-temperature side) for liquefying the natural gas driven by the gas turbine unit 20. The supporting frame 70 supports these devices and their respective accessories.

In the GTCC facility 10B of the present embodiment, two sets of combinations of the gas turbine unit 20, the heat recovery steam generator 30, and the compressor 80 are disposed side by side, and are symmetrically disposed in the width direction.

The steam produced in the heat recovery steam generator 30 in the present embodiment can be supplied as a heat source of, for example, a device for removing an acidic gas component included in the natural gas or a device for removing moisture include in the natural gas. Additionally, the steam produced with the heat recovery steam generator 30 in the present embodiment can be supplied as the driving energy of a steam turbine that drives, for example, a natural gas booster compressor, a stabilizer overhead compressor, an end flash gas compressor, or the like.

Even in the GTCC facility 10B of the present embodiment, similar to the above first embodiment, at least a portion of the heat recovery steam generator 30 is disposed at the same position as the gas turbine unit 20 in the height direction. Moreover, the gas turbine unit 20 and the heat recovery steam generator 30 are disposed in parallel. Therefore, it is possible to suppress the height of the gas turbine unit 20 and the heat recovery steam generator 30 to achieve a lower center of gravity as compared to the case where the gas turbine unit 20 and the heat recovery steam generator 30 are stacked, while suppressing the installation floor space of the GTCC facility 10B.

Additionally, the stability of the vessel F equipped with such a GTCC facility 10B is increased due to the achievement of a lower center of gravity of the GTCC facility 10B.

Additionally, in the heat recovery steam generator 30, the boiler body 31 is configured by providing the plurality of boiler units 31p in parallel in the vertical direction and the width direction, so that it is possible to achieve weight reduction while making the installation floor space of the heat recovery steam generator 30 smaller.

Other Embodiments

The gas turbine combined cycle facility and the water-surface facility of the invention are not limited to those of the above-described respective embodiments described with reference to the drawings, and various modification examples can be considered in the technical scope of the invention.

For example, in the above respective embodiments, the number of boiler units 31p is six, and the boiler units are disposed in parallel in three stages in the height direction and disposed in parallel in two rows in the width dimension. However, the number of boiler units 31p and the numbers of boiler units that are disposed in parallel in the height direction and the width direction may be any other than this.

In the above respective embodiments, the gas turbine unit 20 and the heat recovery steam generator 30 are disposed in parallel in a plan view. However, the gas turbine unit 20 and the heat recovery steam generator 30 may be disposed so as to be shifted from each other in the turbine axis direction S1 of the gas turbine unit 20.

Moreover, as a GTCC facility, a power generator may be driven by the gas turbine unit 20.

Additionally, the devices and the accessories that constitute the GTCC facility 10A and 10B can be appropriately changed according to applications, processing scales, or the like.

In addition, in the above respective embodiments, the GTCC facility 10 is provided on the vessel F. However, the invention is not limited to only the vessel F, and may be applied to any type of water-surface facilities if they are water-surface facilities, such as floating bodies including floating structures.

Except for this, the configurations mentioned in the aforementioned embodiments can be selected or can be appropriately changed to other configurations unless these depart from the spirit of the invention.

INDUSTRIAL APPLICABILITY

The invention relates to the gas turbine combined cycle facility installed on vessels or floating structures used on the water surface, and the water-surface facility including the same. According to the gas turbine combined cycle facility and the water-surface facility including the same in the invention, a lower center of gravity can be achieved by suppressing the height while suppressing the installation floor space, and the stability of the water-surface facility can be enhanced.

REFERENCE SIGNS LIST 10A, 10B: GTCC FACILITY
20: GAS TURBINE UNIT
21: CASING
22: INTAKE DUCT
23: COOLING INTAKE DUCT
24: COOLING EXHAUST DUCT
25: LUBRICATING OIL SUPPLY UNIT
30: HEAT RECOVERY STEAM GENERATOR
31: BOILER BODY
31$p$: BOILER UNIT
32: EXHAUST GAS CONNECTION DUCT (EXHAUST DUCT)
32$a$: FIRST END
32$b$: SECOND END
32$c$: ORIENTATION CHANGING PART
32$g$: GUIDE VANE
33: EXHAUST STACK
34: FEED-PUMP UNIT
35: FUEL VALVE UNIT
36: STEAM-WATER SEPARATION DRUM (STEAM-WATER SEPARATOR)
37: CONDENSER
38: ASSEMBLY
40: GAS COMPRESSOR
50: STEAM TURBINE
60: COMPRESSOR
70: SUPPORTING FRAME
71A, 71B, 71C: BASE MEMBER
80: COMPRESSOR
F: VESSEL (FLOATING BODY)

The invention claimed is:

1. A gas turbine combined cycle facility comprising:
   a gas turbine unit provided with an intake duct;
   a heat recovery steam generator for recovering exhaust gas from the exhaust gas produced by the gas turbine unit and producing steam;
   an exhaust duct for guiding the exhaust gas of the gas turbine unit to the heat recovery steam generator; and
   a supporting frame which supports the gas turbine unit, the heat recovery steam generator, and the exhaust duct, wherein
   the supporting frame includes a plurality of base members which are arranged in a vertical direction,
   the plurality of base members includes a first base member positioned on an uppermost layer, a second base member positioned on an intermediate layer, and a third base member positioned on a lowermost layer, wherein the area of the third base member is larger than the area of the second base member,
   the intake duct is disposed on the first base member,
   the gas turbine unit is disposed on the second base member,
   the heat recovery steam generator is disposed on the third base member,
   a height of the heat recovery steam generator extends above the second base member, and
   the heat recovery steam generator is disposed side-by-side so that a direction in which exhaust gas flows in the heat recovery steam generator is parallel to a turbine axis direction of the gas turbine unit.

2. The gas turbine combined cycle facility according to claim 1,
   wherein the heat recovery steam generator includes a plurality of boiler units that produces steam through heat exchange with the exhaust gas introduced from the exhaust duct, the plurality of boiler units are disposed to be stacked at least in a height direction in a state where the orientations of the respective boiler unit of the plurality of boiler units are aligned, and the exhaust gas is introduced into each of the plurality of boiler units.

3. The gas turbine combined cycle facility according to claim 2,
   wherein a steam-water separator that separates steam and water, which have been produced in each of the respective boiler unit of the plurality of boiler units, and
   the steam-water separator circulates the separated water and is connected to each of the plurality of boiler units.

4. The gas turbine combined cycle facility according to claim 3,
   Wherein a plurality of the steam-water separators are respectively disposed on upper lateral sides of the plurality of boiler units, the relative positions thereof are the same in the respective boiler unit of the plurality of boiler units, and the heat recovery steam generator is used as a natural circulation boiler.

5. The gas turbine combined cycle facility according to claim 3,
   wherein the plurality of boiler units and the steam-water separator are used as an assembly that are integrated in advance.

6. The gas turbine combined cycle facility according to claim 1,
   wherein at least some of accessories of the gas turbine unit and accessories of the heat recovery steam generator are disposed below the second base member and are disposed on the first base member.

7. A water-surface facility comprising:
   a floating body that floats on water; and
   the gas turbine combined cycle facility according to claim 1 provided on the floating body.

8. The gas turbine combined cycle facility according to claim 4,
   wherein the plurality of boiler units and the steam-water separator are used as an assembly that are integrated in advance.

9. The gas turbine combined cycle facility according to claim 2,
   wherein at least some of accessories of the gas turbine unit and accessories of the heat recovery steam generator are disposed below the second base member and are disposed on the first base member.

10. The gas turbine combined cycle facility according to claim 3,
    wherein at least some of accessories of the gas turbine unit and accessories of the heat recovery steam generator are disposed below the second base member and are disposed on the first base member.

11. The gas turbine combined cycle facility according to claim 4,
    wherein at least some of accessories of the gas turbine unit and accessories of the heat recovery steam generator are disposed below the second base member and are disposed on the first base member.

12. The gas turbine combined cycle facility according to claim 5, wherein at least some of accessories of the gas turbine unit and accessories of the heat recovery steam generator are disposed below the second base member and are disposed on the first base member.

13. A water-surface facility comprising:
a floating body that floats on water; and
the gas turbine combined cycle facility according to claim 2 provided on the floating body.

14. A water-surface facility comprising:
a floating body that floats on water; and
the gas turbine combined cycle facility according to claim 3 provided on the floating body.

15. A water-surface facility comprising:
a floating body that floats on water; and
the gas turbine combined cycle facility according to claim 4 provided on the floating body.

16. A water-surface facility comprising:
a floating body that floats on water; and
the gas turbine combined cycle facility according to claim 5 provided on the floating body.

* * * * *